United States Patent [19]

Williamson

[11] 4,292,531

[45] Sep. 29, 1981

[54] ELECTRICAL PROPULSION PROCESS AND SYSTEM FOR A TRACTION VEHICLE WITH AN ON-BOARD SOURCE OF POWER

[75] Inventor: Dennis F. Williamson, Kingston, Canada

[73] Assignee: General Electric Company, Erie, Pa.

[21] Appl. No.: 16,755

[22] Filed: Mar. 2, 1979

Related U.S. Application Data

[63] Continuation-in-part of Ser. No. 864,422, Dec. 27, 1977, abandoned.

[51] Int. Cl.$^3$ .................. B60L 11/02; B61C 9/38; H02P 5/28; H02M 5/45
[52] U.S. Cl. ............................... 290/14; 290/17; 318/798; 318/151; 318/158; 363/37
[58] Field of Search .................. 363/137, 37; 318/798–803, 140–158; 290/14, 17

[56] References Cited

U.S. PATENT DOCUMENTS

| | | | |
|---|---|---|---|
| 3,551,685 | 12/1970 | Corry | 290/14 |
| 3,659,168 | 4/1972 | Salihi et al. | 290/14 |
| 3,713,504 | 1/1973 | Shimer et al. | 318/148 |
| 3,882,371 | 5/1975 | Shimer et al. | 318/810 |

*Primary Examiner*—J. V. Truhe
*Assistant Examiner*—John B. Conklin
*Attorney, Agent, or Firm*—Albert S. Richardson, Jr.

[57] ABSTRACT

A self-propelled traction vehicle equipped with an a-c traction motor energized by the a-c output of a controlled current inverter is propelled by a process comprising the steps of providing a traction alternator on-board the vehicle, rotating the rotor of the alternator, exciting the field winding of the alternator, converting the output current of the armature windings of the alternator to a unidirectional current, and feeding the unidirectional current to d-c terminals of the controlled current inverter without appreciably smoothing the unidirectional current. A system for carrying out this process is also disclosed.

11 Claims, 7 Drawing Figures

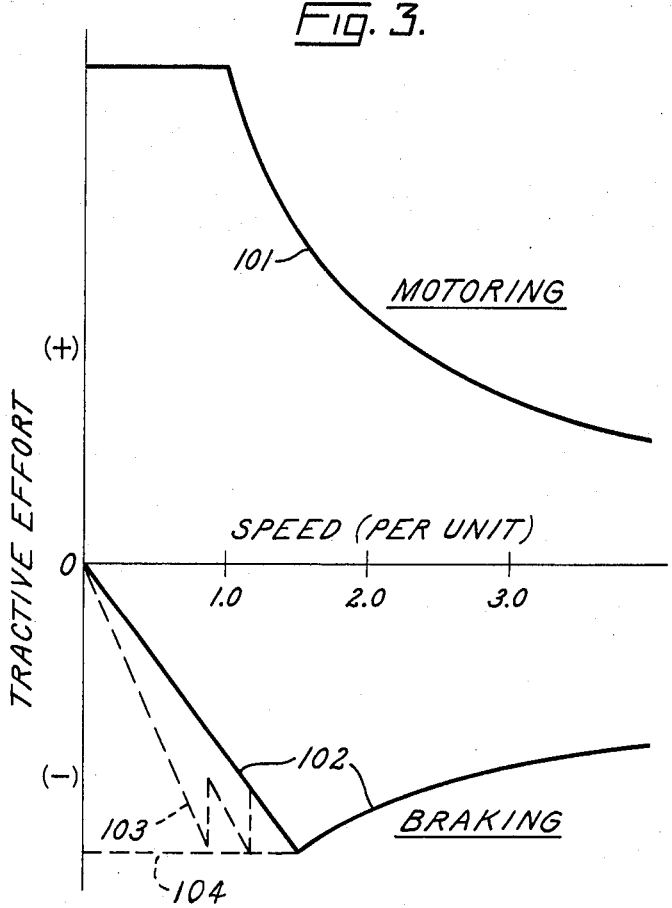
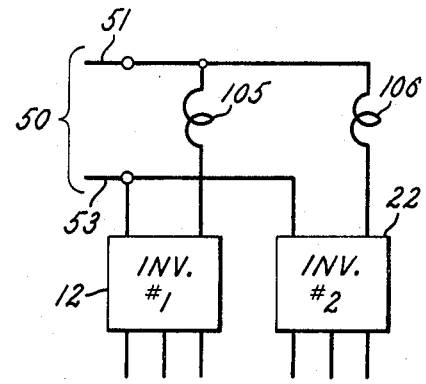
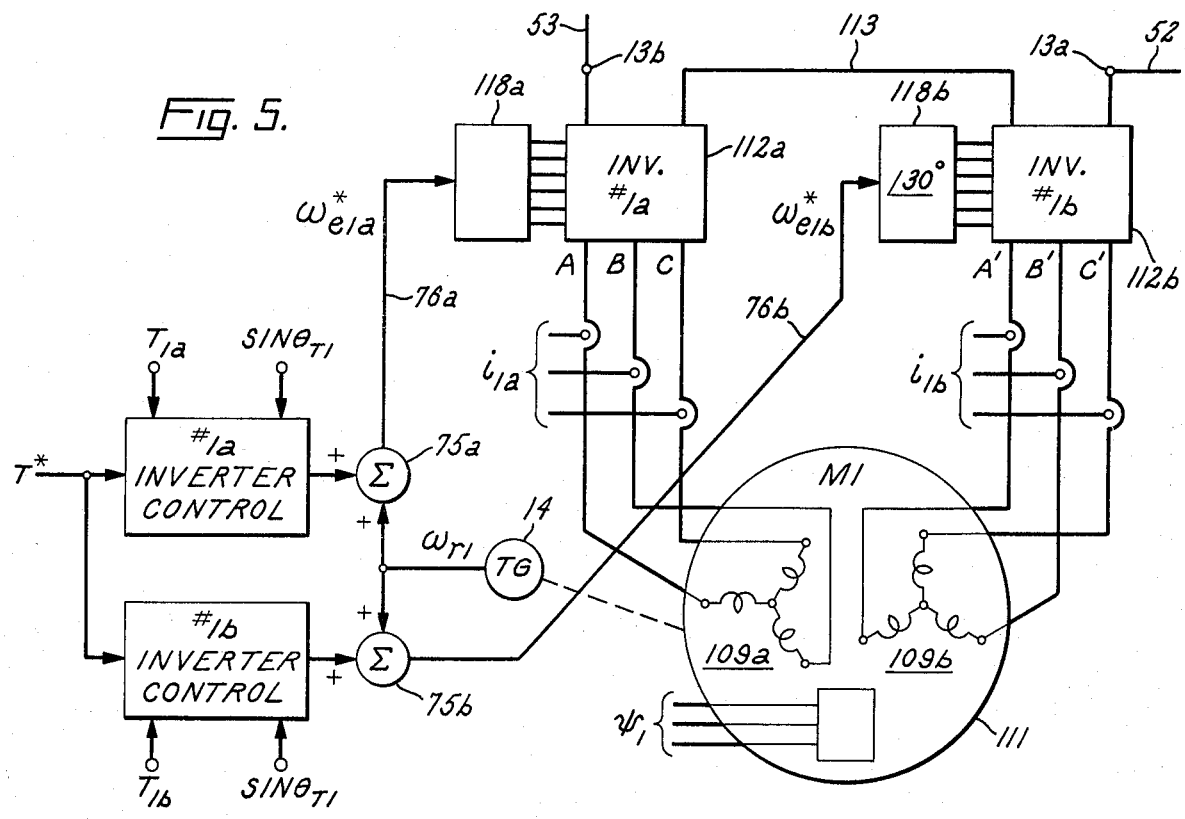

ELECTRICAL PROPULSION PROCESS AND SYSTEM FOR A TRACTION VEHICLE WITH AN ON-BOARD SOURCE OF POWER

CROSS-REFERENCE TO RELATED APPLICATION

This is a continuation-in-part of my copending U.S. patent application Ser. No. 864,422 filed on Dec. 27, 1977 now abandoned.

BACKGROUND OF THE INVENTION

This invention relates generally to new and improved means for propelling a vehicle, and it relates more particularly to a propulsion method and system for an internally powered traction vehicle that is driven by the combination of a prime mover, electric power generating means, and adjustable speed a-c electric motors.

In a large self-propelled electrically driven traction vehicle, such as a locomotive or an off-highway truck, the wheels of the vehicle are propelled (or retarded) by electric motors energized by electric power generated by a rotating electrodynamic machine that in turn is driven by an on-board thermal prime mover such as a diesel engine. See for example U.S. Pat. No. 3,878,400—McSparran. Heretofore traction motors commonly have been of the direct current (d-c) variety, and the necessary d-c excitation for such motors has been supplied either by using a d-c generator or, alternatively, by rectifying the output of an alternating current (a-c) generator.

Because a-c motors are generally more simple and compact than d-c motors, are not limited by commutator constraints, are capable of greater tractive effort than d-c motors at high speeds, and are relatively light weight, low cost, and easy to maintain, persons working in this art have been giving increasing attention to utilizing adjustable speed a-c traction motors rather than d-c motors in drive systems for electrically propelled traction vehicles. In an a-c propulsion system, traction motor speed (and hence vehicle speed) is dependent, in large measure, on the fundamental frequency of the excitation supplied to the stator windings of the motors, and in order to control the frequency it has been proposed to supply excitation to the motors via variable-frequency electric power static inverters or frequency changers formed by a plurality of controllable electric valves or semiconductor switching elements (e.g., thyristors) of the kind having the ability to hold off forward voltage until turned "on" in response to a suitable firing or gate signal. Once a valve is triggered or fired by its gate signal, it switches from a blocking or nonconducting state to a forward conducting state in which it can freely conduct load current until this current is subsequently transferred or commutated to a companion valve in the power conversion apparatus. In the case of an inverter, the valves are arranged in alternative paths of load current conduction between a set of a-c terminals (which are connected to the stator windings of the a-c motor) and a pair of d-c terminals (which are adapted to be coupled to a suitable d-c power supply), and they are cyclically fired in a predetermind sequence so as to convert d-c power into a-c power having a fundamental frequency determined by the switching frequency of the valves. Either voltage or current source inverters can be utilized With a voltage source inverter, the amplitude and frequency of the fundamental alternating voltage that is supplied to the stator terminals of the associated a-c motors are controlled, and stator current can vary widely in magnitude. With a current source inverter (hereinafter also referred to as a controlled current inverter) the quantities that are controlled are the amplitude and frequency of alternating current exciting the stator windings, and the voltage magnitude can change rapidly during commutation. A controlled current type of inverter is required in practicing the present invention. For a particular example of a circuit well suited for this purpose, see the improved auto-sequential commutated inverter that is described and claimed in U.S. Pat. No. 3,980,941—Griebel.

As is well known to persons skilled in the art, there are fundamental differences between current and voltage source inverters. (See. e.g., "Survey of Controlled Electronic Power Converters" by W. McMurray, pp. 39–62 of survey papers of IFAC Symposium, Duesseldorf, Germany, October 1974.) For the convenience of the reader, the distinguishing characteristics of these two classes of inverters will now be reviewed.

In the case of a voltage source inverter (sometimes also referred to as a "voltage fed" or "controlled voltage" inverter), the d-c terminals of the inverter need to be coupled to a source of direct voltage characterized by relatively constant magnitude and unchanging polarity. In practice, the voltage fed inverter is supplied from a fixed or adjustable source of relatively smooth direct voltage without an intervening current-smoothing choke of significant size, and the inverter valves are cyclically fired in a predetermined sequence so that square wave or quasi-square wave voltages are applied to the load. (For this discussion the load is assumed to be a polyphase a-c traction motor.) The magnitude of motor current will depend on both the applied voltage and the motor impedance, and it can vary widely.

Because of the reactive nature of the motor load, motor current is not in phase with motor voltage and there are cyclic periods when the direction of current reverses with respect to the polarity of the applied voltage. Therefore, in a voltage fed inverter, feedback rectifiers (diodes) are connected across the main controllable valves of the inverter to accommodate the reverse current flow, and the input current to the inverter will have an a-c component. The d-c link that interconnects the direct voltage source and the d-c input terminals of the voltage fed inverter must include a "sink," which is ordinarily a parallel capacitor, for alternately accepting and delivering this a-c component of current. The parallel capacitor also serves to smooth the input voltage where the output of the direct voltage source is in the form of rectified alternating voltage having a high ripple content. To assist this voltage smoothing or filtering action of the parallel capacitor, the d-c link will usually include a small series inductor which may also be necessary to prevent capacitor inrush current from exceeding a level that would damage the valves of the rectifier circuit. Since the parallel capacitor maintains the voltage on the d-c terminals of the inverter substantially equal to the average magnitude of voltage at the output of the voltage source, the maximum voltage absorbed by the series inductor in the d-c link is relatively low. Therefore the total series inductance in the d-c link of a voltage fed a-c motor drive system can be relatively small, and in fact it must be small to avoid impeding the required reversal of current in the link in the event of regeneration when the traction vehicle is braking and the motor is operating as a generator driven by mechanical inertia.

In summary, the functions of the capacitor on the d-c link of a voltage fed system (i.e., a system utilizing a voltage source inverter) are to provide a low impedance path for the a-c component of link current and to limit the rate of change of direct voltage that is applied to the d-c terminals of the inverter. More specifically, the capacitance provided by the filter in the d-c link, taken together with any other inherent or stray capacitance of the link, reduces the steady-state ripple content of d-c link voltage. As a general rule, the filter is sized to limit ripple voltage to less than approximately 15 percent of the average magnitude of voltage on the d-c link of the voltage fed induction motor drive system, and in the case of electrolytic capacitors even greater voltage smoothing action is obtained because the filter has to be large enough to conduct, without overheating, the peak a-c component of current in the d-c link.

In contrast to a voltage source inverter, a controlled current inverter must have its d-c terminals coupled to a source of relatively smooth direct current, and this current is restricted to one direction in the interconnecting d-c link. Reversal of power flow during electrical braking is accomplished by reversing the polarity of the direct voltage. As the respective valves of the controlled current inverter are fired in sequence, link current is commutated from phase to phase in the stator windings of the traction motor connected to the a-c terminals of the inverter. Consequently the inverter supplies the motor with square wave or quasi-square wave currents. The amplitude of motor current is determined by the magnitude of current supplied by the direct current source, while motor voltage is determined by motor impedance and counter electromotive force and can vary widely. Therefore in a current source inverter the voltage at the d-c input terminals of the inverter has to be unconstrained and free to vary at will, and the inverter would be subject to material change in its behavior if appreciable capacitance were provided in parallel with its d-c terminals for smoothing this voltage.

The current source of a controlled current inverter is suitably controlled or regulated so as to set and maintain a desired magnitude of direct current. In an internally powered vehicle having an on-board prime mover, the d-c source would logically comprise a rotating d-c generator having its armature connected to the d-c terminals of each controlled current inverter by way of a d-c link including a current smoothing filter, and current magnitude would be regulated by appropriately controlling the electromagnetic excitation of the generator to thereby adjust the magnitude of voltage that the generator impresses on the d-c link. The current smoothing filter ordinarily is in the form of a series inductor (also referred to as a reactor or choke), and its functions are to absorb the short duration, high magnitude voltage transients that periodically occur between the source and the respective d-c terminals of the controlled current inverters and to limit the rate of change of direct current that is supplied to each separate inverter-motor set. More specifically, the inductance provided by the filter in the d-c link, taken together with any other source inductance and with the motor inductance, reduces the steady-state ripple content of motor current so as to minimize certain resulting torque harmonics in the traction motor. As a general rule, the filter is sized to limit ripple current to approximately 10 to 20 percent of the average magnitude of current in the d-c link of the current fed induction motor drive system.

Insofar as I am presently aware, persons skilled in the art have not previously recognized that in a traction vehicle having a self-contained current source a-c motor drive, the current smoothing filter can be omitted altogether from the d-c link, thereby realizing a significant reduction in size, weight, and cost of the propulsion system, if the d-c generator were replaced by the rectified output of an a-c generator of the kind heretofore used for traction vehicle applications.* To better understand this discovery, the characteristics of an a-c generator that I believe make it uniquely well suited to be used in combination with a controlled current inverter will now be briefly reviewed.

*The rectified output of a diesel engine-driven 3-phase alternator has heretofore been proposed as the d-c power supply for voltage source inverters in an a-c traction motor propulsion system for locomotives. See the paper entitled "A New Converter Drive System for a Diesel-Electric Locomotive with Asynchronous Traction Motors" by J. Brenneisen et al, published in IEEE Transactions on Industry Applications, Vol. IA-9, No. 4, pp. 482-90 (July/August 1973). The voltage source inverters of the Brenneisen et al system are typified by a voltage smoothing filter (capacitor $C_d$ in FIG. 6) connected in parallel with their d-c terminals and by the pulsewidth modulated voltage control shown in FIGS. 13 and 14 and described on pages 485 and 488 of the paper. As was explained above in the review of voltage source inverters, series inductors of relatively small inductance values are usually provided in the d-c links of such systems to enhance the voltage smoothing action of the parallel capacitor. Brenneisen et al suggest (page 485) that the reactances of the alternator will act in place of such prior art chokes. Note that the present invention relates to a current source a-c motor drive differing significantly in general character, and especially operationally, from voltage source systems such as disclosed by Brenneisen et al, and there is nothing in the referenced paper to indicate any awareness by the authors that a current source system could be developed to operate successfully without the large inductor heretofore conventionally provided in the d-c link to smooth the current delivered to controlled current inverters.

An a-c generator, of the type known as a synchronous generator, is a machine having an armature winding in which alternating current flows and a field winding to which d-c excitation is supplied. The armature winding usually is on the stator, and in a 3-phase machine the windings of the individual phases are displaced from each other by 120 electrical degrees in space around the circumference of the stator-rotor air gap. The field winding is located on the rotor, which can be of either salient-pole or cylindrical construction, and the field poles are excited by direct current brought in through slip rings or by a brushless exciter. The field produced by the d-c rotor winding revolves with the rotor. If the rotor is driven by a prime mover to which it can be mechanically coupled, the magnetic field produced by the rotor winding will induce in the stator windings an alternating voltage having a frequency proportional to the number of poles and the angular velocity of the rotor. Ordinarily the stator windings are distributed in such a manner that the alternating voltage has a generally sinusoidal wave form, but they can alternatively be arranged to generate other wave forms if desired.

Synchronous generators designed specifically for traction vehicle applications (hereinafter referred to as traction alternators) ordinarily are high-reactance machines. By high reactance I mean that the armature reaction (in ampere-turns per pole) of the machine at full-load current is a large percentage (e.g., 200%) of the no-load field ampere-turns at rated voltage and frequency. Armature reaction refers to the effect of magnetomotive force (mmf) resulting from current in the armature windings. The armature mmf modifies the electromagnetic flux produced by current in the field windings and changes the strength of the resultant field in the stator-rotor air gap of the machine. If an electric load connected to the armature terminals of a traction alternator were short circuited and the field excitation were held constant, the armature mmf will almost directly oppose the field mmf, thereby demagnetizing or weakening the resultant air gap field and limiting the rise in armature current. In effect the rate of change of current is limited by a transient reactance similar to the equivalent reactance of a short-circuited transformer. The final value of short circuit current is proportional to the synchronous impedance of the machine.

A typical traction alternator at normal excitation and speed has sufficiently large reactance to limit steady-state short circuit current to less than rated full-load current. This reactance is sometimes referred to as the steady-state unsaturated synchronous reactance $x_s$ of the alternator. In practice its per unit value is in a range from 1.0 to 3.0, and therefore a typical traction alternator will tend to maintain rated current with changing load impedance.

Representative of traction alternators suitable for the practice of my present invention is General Electric model GTA22 manufactured by the General Electric Company, Transportation Systems Business Division in Erie, Pa. The horsepower rating of this machine is approximately 1,200 at rated engine speed. Contributing to the relatively high synchronous reactance of the GTA22 alternator is the fact that it has no amortisseur windings. Amortisseur windings are short-circuited damper bars or squirrel-cage windings that are often inserted in the rotor pole faces of synchronous generators for the purpose of producing torques that help to damp out mechanical oscillations of the rotor about its equilibrium position. Such windings also improve the transient voltage regulation of the machine. By voltage regulation I mean the tendency of the voltage amplitude at the terminals of the stator windings to remain substantially constant, under conditions of constant excitation and frequency, regardless of variations in the electrical load connected across the terminals. When amortisseur windings are used in a synchronous generator, they effectively oppose changes of electromagnetic flux in the air gap and thereby reduce the rate at which terminal voltage transiently varies in response to rapid changes in the load. In some applications (e.g., electric utilities where a-c generators are operated in parallel with one another to supply interconnected power distribution systems), the damping and good voltage regulation provided by amortisseur windings are desired, but in traction applications these features are not needed, and thus traction alternators ordinarily do not require the use of amortisseur windings. As a result of its high synchronous and its omission of amortisseur windings, a traction alternator is specially well suited for use in combination with controlled current inverters supplying adjustable speed a-c traction motors.

SUMMARY OF THE INVENTION

A general objective of the present invention is to provide an improved traction vehicle propelling process that can be carried out by lighter weight, more compact, and less expensive apparatus than has heretofore been possible.

In carrying out my invention in one form, a traction vehicle is equipped with a prime mover, at least one variable-frequency controlled current inverter having a set of a-c terminals and a pair of d-c terminals, and at least one adjustable speed a-c traction motor connected to the a-c terminals of the inverter by way of alternating current conductors, and the vehicle is propelled (motoring mode of operation) or retarded (braking mode of operation) by the process of providing on-board the vehicle a traction alternator having armature and field windings and a rotor, drivingly coupling the prime mover to the rotor of the alternator, exciting the field winding of the alternator, interconnecting the armature windings of the alternator and the d-c terminals of the controlled current inverter by way of a rectifier bridge and a d-c link without appreciably smoothing either the direct current flowing in the link or the voltage across the d-c terminals of the inverter, controlling the switching frequency of the inverter so as to vary, as desired, the fundamental frequency of the alternating current energizing the motor during motoring operation of the vehicle, and controlling the excitation of the field winding so as to vary, as desired, the fundamental amplitude of the alternating output current of the alternator armature windings, thereby varying the average magnitude of direct current in the d-c link and hence the fundamental amplitude of the alternating current being supplied to the motor through the aforesaid conductors during the motoring mode of operation.

BRIEF DESCRIPTION OF THE DRAWINGS

My invention will be better understood and its various objects and advantages will be more fully appreciated from the following description taken in conjunction with the accompanying drawings in which:

FIG. 3 is a graph showing how tractive effort varies as a function of speed for the FIG. 1 vehicle when motoring with a throttle setting of 1.0 per unit and also showing an exemplary tractive effort vs. speed characteristic during a braking mode of operation;

FIG. 4 is a schematic circuit diagram of a variation of the power circuit shown in FIG. 1, whereby the traction motors are energized in parallel instead of in series; and FIG. 5 is a schematic diagram of a variation of one of the FIG. 1 motors and its associated inverter(s) and controls, which motor utilizes two sets of phase-displaced star-connected 3-phase stator windings.

DESCRIPTION OF THE PREFERRED EMBODIMENTS

Figure 1:
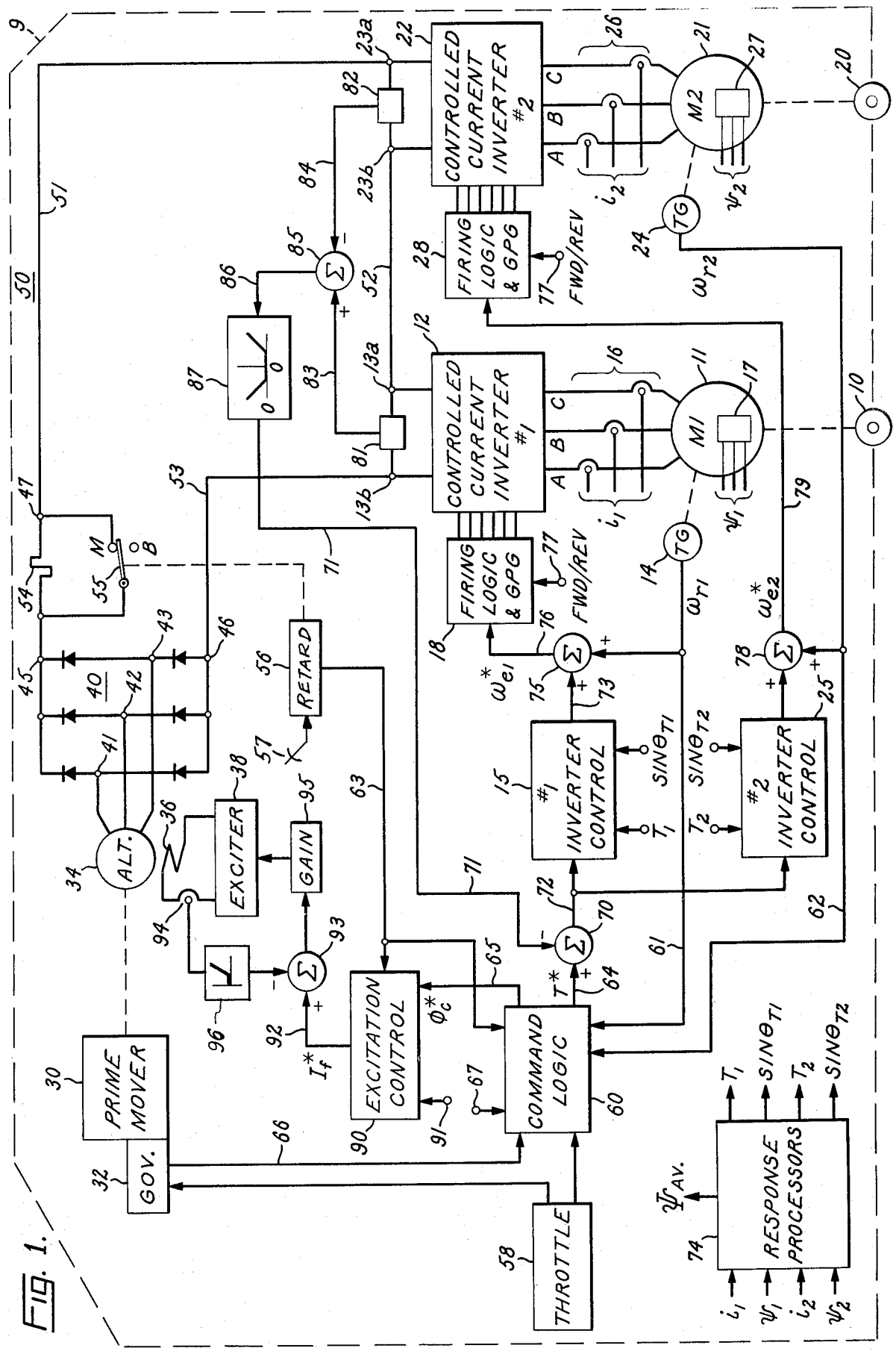
FIG. 1 is a functional block diagram of a self-contained propulsion system for a traction vehicle driven by two sets of inverters and a-c motors interconnected in series, which system embodies my invention in one form.

In FIG. 1 a traction vehicle such as a locomotive or an off highway truck is represented generally by the broken line block 9 having a plurality of wheels, only two of which are shown at 10 and 20. In order to drive the illustrated wheels and thereby propel or retard the vehicle 9, electric traction motors 11 and 21 are mounted on the vehicle with their shafts mechanically coupled to the wheels 10 and 20, respectively. The motors 11 and 21 are polyphase adjustable speed a-c motors, preferably of the induction type but optionally of the synchronous, synchronous reluctance, or other known type, and they can be either round or linear.

Each of the motors 11 and 21 is assumed to have 3-phase star-connected stator windings that are connected for energization to a set of a-c terminals of a corresponding one of a pair of static electric power inverters 12 and 22 by way of three alternating current conductors A, B, and C. The number of phases is not critical, and motors having single, double, six or more phases can be alternatively used if desired.

Each of the inverters 12 and 22 is a controlled current inverter suitably constructed and arranged to excite the stator windings of the associated traction motor with alternating current of variable frequency and amplitude. The power circuit shown and described in U.S. Pat. No. 3,980,941 —Griebel is well suited for this purpose. The excitation current is derived from a controllable d-c power supply to which the d-c terminals of each inverter are connected. In accordance with the present invention, the controllable d-c power supply comprises a prime mover-driven traction alternator having armature windings connected to the d-c terminals of the respective inverters through a rectifier bridge and a d-c link having no current smoothing choke. In FIG. 1 the prime mover is shown at 30, the alternator at 34, the rectifier bridge at 40, and the d-c link at 50.

The prime mover 30 is a thermal machine, such as a diesel engine or a gas turbine, capable of converting the heat of a combustible fuel into rotary motion of a drive shaft. Its rate of rotation (revolutions per minute) is controlled by a governor 32. In the presently illustrated embodiment of the system, the prime mover is intended to run at a variable speed, but alternatively it could be arranged to run at a substantially constant speed if desired.

The traction alternator 34 has a rotor that is mechanically coupled to the drive shaft of the prime mover 30, a field winding 36 located physically on the rotor and connected electrically to a suitable source 38 of excitation, and a plurality of armature windings physically located on the stator of the alternator so as to have induced therein 3-phase alternating voltage having a fundamental frequency that varies with the speed at which the field is rotated and a fundamental amplitude that depends on both the speed and the excitation of the field winding 36. The traction alternator 34 is characterized by a high synchronous reactance (e.g., approximately 2.0 per unit) and the absence of amortisseur windings. It can advantageously be the same as or a modification of the General Electric model GTA22 traction alternator that was referred to in the introductory portion of this specification. Such a machine also has a high transient reactance which is advantageous in practicing the present invention.

The rectifier bridge 40 comprises an array of six uncontrolled electric valves or diodes interconnected and arranged in a full-wave double-way configuration having three a-c terminals 41, 42, and 43 and a pair of d-c terminals 45 and 46. The a-c terminals of the bridge are respectively connected to the armature winding terminals of the traction alternator 34, and the d-c terminals are connected to the d-c link 50, whereby the alternating output current of the alternator 34 is converted by the bridge 40 to a unidirectional current in the d-c link 50. The unidirectional current is fed over the link 50, without being appreciably smoothed or filtered, to the d-c terminals of the inverters 12 and 22. I have discovered that the heretofore conventional current smoothing choke can be omitted altogether from the d-c link 50, or, if provided, its size can be materially reduced, because of the tendency of the traction alternator 34 to supply substantially controlled magnitude current to the inverters 12 and 22, as previously explained.

The d-c link 50 includes a conductor 51 connected between the anode terminal 45 of the bridge 40 and a first d-c terminal 23a of the controlled current inverter 22, a conductor 52 connected between the other d-c terminal 23b of the inverter 22 and a first d-c terminal 13a of the controlled current inverter 12, and a conductor 53 connected between the second d-c terminal 13b of the inverter 12 and the cathode terminal 46 of the bridge 40. There is no voltage smoothing capacitor spanning the conductors 51 and 53 and no current smoothing inductor in series therewith. A dynamic braking resistor 54 shunted by a switch 55 is connected in series with one of these conductors, preferably between the anode terminal 45 of the rectifier bridge and a proximate terminal 47 of the conductor 51.

The switch 55 across the resistor 54 is coupled to a retard controller 56 that determines its open or closed state. During periods of motoring (M), the switch 55 is closed and thus provides a path of negligible impedance across the resistor 54 for current flowing in the d-c link 50 during such periods, whereas during periods of braking (B) the switch is open and thus effectively interposes the resistor 54 in series with the d-c link. When in an electrical braking (retarding) mode of operation, the a-c traction motors 11 and 21 are driven by the inertia of the vehicle and consequently serve as generators delivering power to the inverters 12 and 22, respectively, and during such periods there is a polarity reversal of the voltage across the inverter d-c terminals so that the average potential on terminal 23a (and hence terminal 47 of the d-c link) is negative rather than positive with respect to terminal 13b. In this mode the potential difference between the relatively negative terminal 47 of the d-c link and the more positive anode terminal 45 of the d-c power supply will be absorbed by the braking resistor 54, and the resistor 54 dissipates energy in the form of heat. As will be understood by persons skilled in the art, the vehicle controls include suitable means effective when operating in the retarding mode to reduce the excitation of the alternator 34 to zero so that none of the diodes that form the rectifier bridge 40 is reverse biased, whereby the bridge freely conducts whatever current is flowing in the d-c link 50 during dynamic braking.

The above-described combination forms a current fed a-c motor drive system in which each of the controlled current inverters 12 and 22 is operative, during periods of motoring, to switch the d-c link current in sequence between the respective phases of the stator windings of the connected motor load, thereby supplying to the associated traction motor fundamental alternating output current having a frequency determined by the fundamental switching frequency of the electric valves in the inverter and an amplitude determined by the average magnitude of the unidirectional current in the d-c link 50. The d-c link current in turn is determined by the amplitude of the alternating output current of the armature windings of the traction alternator 34. Because the alternator has a high reactance and no amortisseur windings, the amplitude of its output current remains substantially constant (assuming the alternator speed and excitation are constant) although its electrical load impedance changes widely during the periodic intervals of commutation in the inverters 12 and 22. In other words, the load impedance imposed by the inverter-motor sets is negligible compared to the source impedance of the traction alternator, and the only variable that appreciably influences current amplitude is the amplitude of alternating voltage induced in the armature windings of the alternator. Consequently the rectified output current of the alternator 34 does not have to be filtered or smoothed in the d-c link 50. The d-c link is therefore characterized by inductance of insufficient value to appreciably smooth the link current. For reasons explained hereinbefore, the d-c link 50 is further characterized by capacitance of insufficient value to appreciably smooth the voltage across the d-c terminals of the controlled current inverters 12 and 22. While there is of course stray or inherent circuit capacitance between conductors 51 and 53, and in practice small capacitors might be deliberately connected to the d-c link to provide a snubbing function or the like, any such added capacitance will be substantially less than the capacitance value required for effectively smoothing the direct voltage applied to the d-c input terminals of a so-called controlled voltage inverter, and consequently the inverters 12 and 22 are able to operate in the desired mode of controlled current inverters. To ensure proper operation of the controlled current inverters, the link capacitance should be preferably no higher than approximately ten percent of the minimum value of capacitance that would be provided if the illustrated system were intended to utilize inverters operating in the controlled voltage mode.

By appropriately controlling the frequency, amplitude, and phase sequence of the traction motor excitation current, the vehicle 9 can be propelled or retarded in either forward or reverse directions as desired. For this purpose suitable means is provided for controlling and regulating the speed and excitation of the alternator 34 and the switching frequency of the inverters 12 and 22 in programmed response to an operator controlled throttle 59 (or, during dynamic braking, a manually operated rheostat 57 associated with the retard controller 56) and to certain feedback signals. The throttle 58 is set in accordance with the motor torque or horsepower that is desired during the motoring mode of operation, while the feedback signals are representative of actual motor responses. Before proceeding with a detail description of the illustrated control system, it should be emphasized that a vehicle propulsion process embodying the present invention can alternatively be controlled or regulated by schemes different than the particular one that has been shown in FIG. 1 by way of example.

The throttle 58 provides input control signals to both the governor 32 and a command logic module 60. The governor 32 is operative in response to changes in the throttle setting to appropriately adjust the amount of fuel injection in the prime mover 30 so as to increase the speed of rotation of the alternator rotor as the desired horsepower of the vehicle 9 increases. As the rotor speed varies, so does the fundamental amplitude of both the voltage generated in the armature windings and the resulting output current of the alternator 34 (assuming that field excitation remains constant and load impedance is constant or negligible), and in this manner the magnitude of current supplied to the traction motors 11 and 21 can be varied. A finer or more precise regulation of motor current is obtained by suitably controlling the alternator excitation, as is more fully explained below.

The command logic module 60 is responsive to the input control signal received from the throttle 58 and to motor speed feedback signals $\omega_{r1}$ and $\omega_{r2}$ received over lines 61 and 62 from suitable means, such as tachometer generators 14 and 24, for sensing the actual angular velocity of the rotors of the motors 11 and 21, respectively. The module 60 also receives an input control signal over line 63 from the retard controller 56. Two variable output signals are derived from this module: on line 64 a first one T* representing a commanded value of motor torque; and on line 65 a second one $\phi_C^*$ representing the desired magnitude of motor excitation. As will soon be described, the first output signal determines the fundamental frequency of the traction motor excitation current, whereas the second output signal determines the fundamental amplitude of this current.

Figure 2:
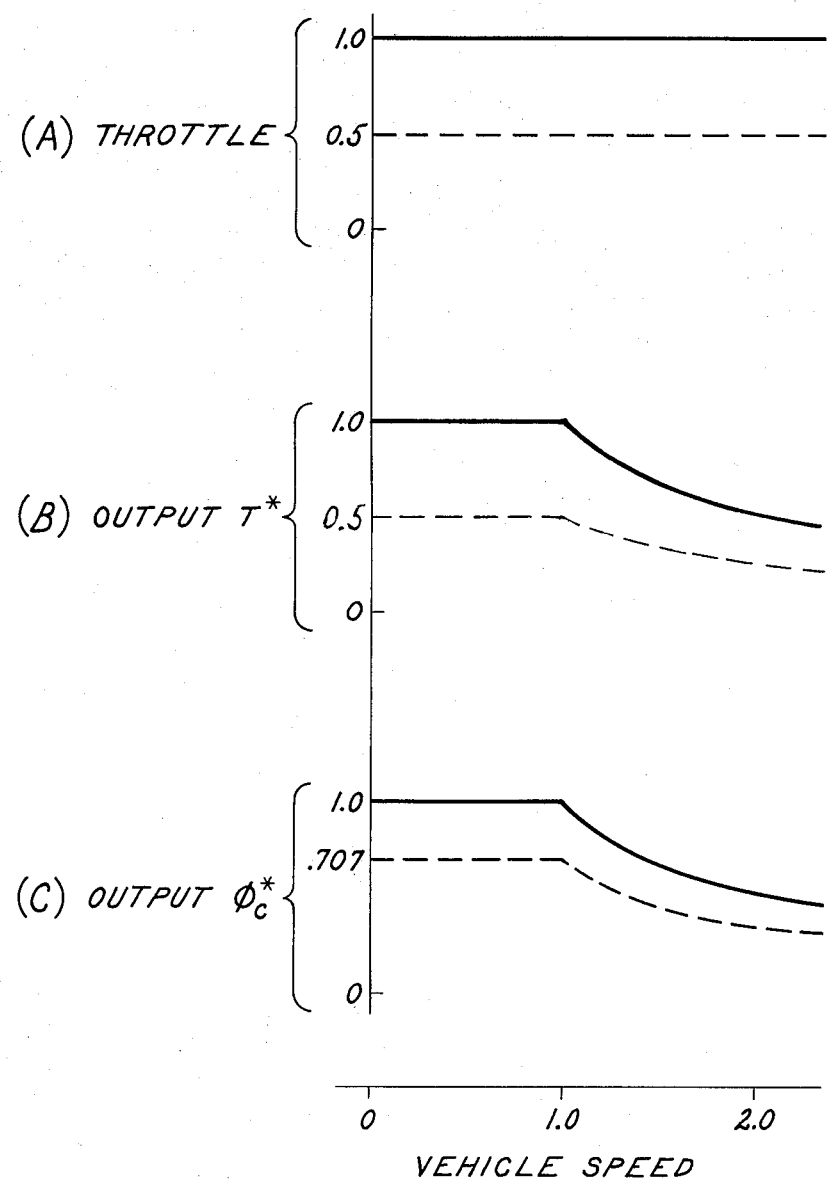
FIGS. 2A, 2B, and 2C are charts of input and output signals of the block labeled Command Logic in FIG. 1, which charts show the relationships between the output signals and vehicle speed that are typically programmed in the Command Logic module at two different settings of the throttle.

Ordinarily the module 60 will be arranged to coordinate the value of $\phi_C^*$ with the value of T* and will be preprogrammed, with conventional rate limits, to vary the values of both of these output signals during the motoring mode of operation as functions of the per unit setting of the throttle 58 in accordance with the schedules indicated in FIGS. 2A, 2B, and 2C where the abscissa is scaled in per unit values of vehicle speed, good adhesion of the wheels being assumed. From the exemplary charts shown in these figures it will be observed that the first output signal T* varies directly with the throttle setting whereas the second output signal $\phi_C^*$ is a square root function of the throttle setting. In addition, both output signals vary as the reciprocal of vehicle speed as the latter increases above a corner point speed of 1.0 per unit. This results in a constant torque control strategy below the corner point speed and a constant horsepower control strategy above that speed, analogous respectively to constant field and to field weakening modes of operation of a conventional d-c traction motor propulsion system.

If the vehicle 9 were a diesel-electric locomotive, the values of the output signals from the command logic module 60 can be influenced if desired by two other input signals. One of the optional additional input signals is received over line 66 from a load control potentiometer or the like in the governor 32. If, in attempting to maintain a set point rotational speed of the prime mover 30, the governor permits fuel to increase to a specific limit that is predetermined for each throttle setting, a signal is developed on line 66 to override the normal program in the command logic module 60 so that the first output signal T* is reduced. This results in electrically unloading the prime mover to match the fuel rate that is permitted, and bogging or stalling of the machine is thereby prevented. The second additional input signal can be a turbospeed signal applied to a terminal 67, which signal is representative of the rotor speed of a turbocharger (not shown) normally associated with the prime mover 30 to supercharge the air in its intake manifold. For each throttle setting, if the actual turbospeed is lower than expected, the turbospeed signal transiently overrides the normal program in the command logic module 60 so that the output signal T* tracks the speed of the turbo while accelerating to steady speed. As a result the power demand will tend to be compatible with the amount of air delivered to the combustion chamber of the prime mover during acceleration, and smoke in the exhaust is inhibited (see the previously cited U.S. Pat. No. 3,878,400).

The first output signal T* on the output line 64 of the command logic module 60 is supplied to summing means 70 which also receives, on a line 71, a voltage imbalance signal and which produces a compensated torque command signal representative of the difference between T* and the voltage imbalance signal (if any). The compensated torque command signal from the summing means 70 is supplied over a line 72 to a duplicate pair of inverter control means 15 and 25 that are respectively associated with the two controlled current inverters 12 and 22.

In the illustrated embodiment of the present invention, each of the inverter control means 15 and 25 is arranged internally in accordance with the teachings of a co-pending U.S. patent application Ser. No. 729,042 filed in the names of J. D. D'Atre, T. A. Lipo, and A. B. Plunkett on Oct. 4, 1976, and assigned to the General Electric Company (now U.S. Pat. No. 4,088,934), and it supplies, on an output line 73, a slip frequency signal that is used to exert control over the switching frequency of the associated controlled current inverter (which frequency determines the fundamental frequency of the motor excitation current) in a manner to regulate motor torque and to stabilize the a-c motor drive system. Toward this end, the first inverter control means 15 is supplied with a torque feedback signal $T_1$ representative of the actual magnitude and relative direction of the torque in the rotor of the first motor 11 when excited, and a torque angle feedback signal $\sin\Theta_{T1}$ representative of the actual phase angle between current and flux that interact in the same motor to develop torque. These feedback signals are derived from response processor circuits in a block 74.

The processor circuits 74 are supplied with a first signal $i_1$ representing excitation current in the stator windings of the motor 11, as measured by an array of three current transformers 16 coupled to the alternating current conductors between this motor and the inverter 12, and with a second signal $\psi_1$ representing the actual electromagnetic flux across the stator-rotor air gap in the motor 11 as detected by a flux sensor 17 located in this motor. The response processor circuits 74 also receive a signal $i_2$ representing excitation current in the stator of the motor 21, as measured by an array of current transformers 26 coupled to the conductors between this motor and the inverter 22, and a signal $\psi_2$ representing the actual flux across the air gap in the motor 21 and detected by a flux sensor 27 located therein, and from the latter signals they derive and supply to the second inverter control means 25 a torque feedback signal $T_2$ representative of the actual magnitude and relative direction of the torque in the rotor of the second motor 21 when excited and a torque angle feedback signal $\sin\theta_{T2}$ representative of the phase angle between current and flux that interact in this motor to develop torque. Preferably the flux sensors 17 and 27 are constructed in accordance with the teachings of U.S. Pat. No. 4,011,489—Franz and Plunkett, the torque processors in block 74 are constructed in accordance with the teachings of U.S. Pat. No. 4,023,083—Plunkett and the torque angle processors in the block 74 are constructed in accordance with the teachings of the above-cited U.S. Pat. No. 4,088,934—D'Atre et al. The disclosures of all three of these patents are incorporated herein by reference.

When arranged in the manner just described, each of the inverter control means 15 and 25 will be effective to supply on its output line a slip frequency signal having a substantially constant steady state value that changes transiently in response to any error between the actual torque angle of the associated motor, as represented by the torque angle feedback signal, and a desired torque angle that itself varies in a corrective sense in response to any non-minimum error between the associated torque feedback signal ($T_1$ or $T_2$) and the compensated torque command signal on line 72.

The slip frequency signal on the output line 73 of the first inverter control means 15 is combined at a summing point 75 with the first motor speed feedback signal $\omega_{r1}$ to derive, on a line 76, an excitation frequency control signal $\omega_{e1}*$ representative of the algebraic sum of the desired slip frequency and the electrical frequency equivalent of the actual speed of rotation of the motor 11 shaft. The latter signal is fed to a block 18 symbolizing known firing logic circuits and a gate pulse generator for the respective valves of the controlled current inverter 12, and its value will determine the inverter's fundamental switching frequency and hence the fundamental frequency of the polyphase excitation current that is supplied by this inverter to the first motor 11. The phase sequence, and hence the direction of rotation of the motor 11, corresponds to the sequencing of the gate pulses, and it is practically determined by a forward/reverse command signal applied to the firing logic circuits at terminal 77. In a similar manner the slip frequency signal on the output line of the second inverter control means 25 is combined at a summing point 78 with the second motor speed feedback signal $\omega_{r2}$ to derive an excitation frequency control signal $\omega_{e2}*$ representative of their algebraic sum, which signal is fed over a line 79 to a block 28 symbolizing known firing logic circuits and a gate pulse generator for the respective valves of the controlled current inverter 22, whereby the inverter's fundamental switching frequency and hence the fundamental frequency of the polyphase excitation currents supplied to the second motor 21 are determined by the value of the excitation frequency control signal on line 79.

In operation, each of the inverter control means will vary the fundamental excitation frequency of the associated traction motor as necessary to preserve a minimum or zero error between desired and actual values of the torque angle of the motor (i.e., the phase angle between motor current and motor flux.) Consequently the moments of current transfer or switching in each controlled current inverter are synchronized with the counter electromotive force of the motor, and the drive system is desirably stabilized. By thus stabilizing the system operation without relying on regulation of current in the d-c link, there is no need to use fast-responding power conditioning means such as a chopper or phase controlled rectifier bridge between the alternator 34 and the d-c link 50, and there is no need to omit amortisseur windings in the traction alternator 34.

Each of the inverter control means is also effective to vary the desired torque angle, and hence the motor excitation frequency, as necessary to minimize or zero any steady-state error between desired and actual values of motor torque. The desired value of torque is determined by the compensated torque command signal on line 72, and it will be the same as the output signal T* from the command logic module 60 except when there is a voltage imbalance signal on line 71. The latter signal is representative of the difference between the voltage across the d-c terminals 13a and 13b of the inverter 12 and the voltage across the d-c terminals 23a and 23b of the inverter 22 when this difference exceeds a predetermined amount. Before describing the illustrated means for obtaining the voltage imbalance signal, it will be noted that such means would not be used in any practical applications of my invention that do not require reducing or reallocating motor torque in the event of unequal voltages on the d-c terminals of the respective inverters 12 and 22.

To derive a voltage imbalance signal on the line 71, a pair of conventional voltage transducers 81 and 82 are connected across the d-c terminals of the inverters 12 and 22, respectively, and voltage feedback signals from these transducers are supplied over the respective lines 83 and 84 to a summing point 85 which produces, an output line 86, a signal that is a measure of their difference. The difference signal on line 86 is coupled to the previously mentioned line 71 through threshold detecting means 87, and the latter means is effective to prevent any voltage imbalance signal from appearing on line 71 unless the difference signal on line 86 is greater than a predetermined amount in either a positive or a negative sense. For differences less than the predetermined amount, a deadband exists and no voltage imbalance signal appears on line 71. This deadband accommodates the normally expected difference between rolling radii of the respective wheels 10 and 20, and its size will ordinarily be determined by the maximum permissible speed differential between the two motors 11 and 21. While not shown in FIG. 1, if desired the voltage imbalance detecting means could alternatively be arranged selectively to reduce the torque command for one of the two motors 11 and 21 (the motor whose associated inverter has the higher voltage across its d-c terminals) and to increase correspondingly the torque command for the other motor (the one whose inverter has the lower d-c voltage). If the vehicle 9 were an offhighway truck, means (not shown) can be provided, if desired, for disabling the threshold detecting means 87 so that no voltage imbalance signal is present on the line 71 while the truck is changing its direction of travel or negotiating turns.

The second output signal $\phi_C^*$ from the command logic module 60 serves as a reference or command signal for an alternator excitation control block 90 to which it is coupled by the line 65. The excitation control block 90 additionally receives an input control signal over line 63 from the brake controller 56 and a motor excitation magnitude feedback signal that is applied to a terminal 91. The latter signal is representative of the average level of excitation in the stators of the traction motors 11 and 21, and during the motoring mode of operation it advantageously comprises a signal $\psi_{av}$ derived by the response processor circuits 74 as a function of the actual magnitude of flux across the air gaps in the motors. The excitation control block 90 is suitably constructed and arranged to provide, on an output line 92, an alternator field current signal $I_f^*$ that varies as a function of any non-minimum difference between the reference signal on line 65 and the motor excitation magnitude feedback signal applied to terminal 91. The output signal $I_f^*$ is used to control the excitation source 38 of the traction alternator 34 so as to determine the magnitude of current in the field winding 36 which in turn determines the fundamental amplitude of the alternating output current of the armature windings of the alternator 34. The source 38 responds to variations in the value of $I_f^*$ by varying the amplitude of the alternator output current as necessary to minimize or zero the difference between the feedback signal on terminal 91 and the reference signal $\phi_C^*$.

Any conventional excitation source 38 can be used in practicing my invention. For example, it could be a brushless exciter built into the alternator 34, a separate "static" exciter, or a rotary exciter mechanically coupled to the drive shaft of the prime mover 30 and electrically connected through slip rings to the field winding 36. In the illustrated embodiment of the invention, field current limiting means is shown between the output line 92 of the excitation control block 90 and the exciter 38. This means comprises a summing means 93 connected to the line 92 for subtracting from the desired alternator field current signal $I_f^*$ a limit signal produced by a threshold detector 96 that is connected to a current transducer 94 in series with the alternator field 36. The output of the summing means 93 is supplied through a gain circuit 95 to the exciter 38. Whenever the actual magnitude of current in the field winding 36 exceeds a predetermined maximum limit, the threshold detector 96 appropriately modifies the output signal of the summing means 93 so as to reduce to a safe level the amount of field current being called for. As a result, alternator overexcitation is prevented in the event of a malfunction such as loss of feedback.

In summary, I have disclosed an improved vehicle propulsion process comprising a new use of a current fed a-c traction motor drive system wherein the d-c link is free of both current smoothing means and voltage smoothing means. More particularly, the process includes the steps of providing on-board the vehicle a traction alternator having armature and field windings and a rotor, rotating the rotor, exciting the field winding, converting the alternating output current of the armature windings to a unidirectional current, feeding the unidirectional current to d-c terminals of a variable-frequency controlled current inverter without appreciably smoothing the unidirectional current and without appreciably smoothing the d-c terminal voltage of the inverter, controlling the switching frequency of the inverter so as to vary the fundamental frequency of its alternating output current as desired, and controlling the excitation of the field winding so as to vary, as desired, the fundamental amplitude of the alternator output current and consequently both the average magnitude of the unidirectional current and the fundamental amplitude of the inverter output current that energizes an adjustable speed a-c traction motor. A practical system for carrying out this process has been shown and described.

The typical performance of a vehicle using the above-described invention is shown in FIG. 3 where the trace 101 represents the tractive effort vs. speed characteristic of the vehicle when motoring with a throttle setting of 1.0 per unit. An exemplary tractive effort vs. speed characteristic 102 during a braking or retarding mode of operation is also shown in FIG. 3. Alternatively, an extended braking program, as represented by broken line 103, is possible if the single braking resistor 54 (see FIG. 1) were replaced by a plurality of sequentially staged dynamic brake resistors. Furthermore, if energy were supplied by the traction alternator, a characteristic shown by the line 104 can be achieved.

Two variations of the current fed a-c motor drive system shown in FIG. 1 will now be disclosed. Instead of being electrically connected in series, the two a-c traction motors 11 and 21 could alternatively be paralleled with one another in which case the first d-c terminals (13a and 23a) of the respective inverters 12 and 22 would be connected in common to the conductor 51 of the d-c link 50 and the other d-c terminals (13b and 23b) of the two inverters would be connected in common to the link conductor 53, as is shown in FIG. 4. In this case it is desirable to deliberately insert, in separate connections, relatively small isolating inductors to prevent the voltage transients generated during commutation in one inverter from being coupled into the other inverter and disturbing its normal operation. This purpose can be served with relatively small and inexpensive inductors 105, 106 having inductance values substantially less than would be required to effectively smooth current of undesirably high ripple content passing through these respective elements (e.g., no higher than approximately ten percent of inductance values of chokes used in the d-c links of prior art current fed a-c motor drive systems). Such small inductors are ineffective per se to appreciably smooth the undulating current in the d-c link. To "appreciably smooth" or for "appreciably smoothing" the link current, as these quoted terms are used in this specification and claims, the link inductance would have to be sufficient to reduce an otherwise unacceptably high steady-state ripple in the link current to a relatively low percentage (e.g., lower than approximately 20 percent) of the average current magnitude, which low percentage is required for proper operation of a current source a-c traction motor drive system. Accordingly, the decoupling inductors in the individual lines that connect the d-c link to the respective inverters in a parallel array of controlled current inverters are not equivalent to the omitted current smoothing choke that has been conventionally provided in prior art current source systems.

It should be noted that in some practical applications of the invention, with either the series (FIG. 1) or parallel (FIG. 4) connections of the inverter-motor sets, it may be desirable to have the motor excitation magnitude feedback signal that is applied to terminal 91 of the alternator excitation control block 90 represent the average magnitude of excitation of whichever motor has the higher actual magnitude of torque, rather than the average excitation in both motors.

Turning now to FIG. 5, there is shown a 6-phase a-c traction motor 111 that can be substituted for each of the 3-phase motors 11 and 21 shown in FIG. 1. A 6-phase motor has the advantage of lower torque pulsations compared to a 3-phase machine. The stator windings of the 6-phase motor 111 are actually arranged in two separate sets 109a and 109b of three star-connected windings, with winding set 109b being displaced 30 electrical degrees from winding set 109a. A controlled current inverter feeding this motor preferably comprises two duplicate parts 112a (labeled "INV. #1a" in FIG. 5) and 112b (labeled "INV. #1b"), each part having the same power circuit configuration as the inverter 12 previously described. As is indicated in FIG. 5, the d-c terminals of the two inverters 1a and 1b and an interconnecting conductor 113 are all serially connected between the conductors 52 and 53 of the d-c link. The firing logic and gate pulse circuits 118a and 118b for the respective inverters 1a and 1b are essentially the same as the corresponding block 18 associated with the inverter 12 of FIG. 1, except that the block 118b is so arranged that the family of the gate pulses it supplies to the valves of the inverter 1b is time displaced by 30 electrical degrees from the gate pulses that the block 118a generates for the inverter 1a. Consequently, the inverter 1b supplies the winding set 109b of the motor 111 with 3-phase alternating current on lines A', B' and C' having a phase displacement of 30 degrees with respect to the 3-phase alternating current that the inverter 1a supplies on lines A, B and C to the winding set 109a.

The fundamental frequency of the alternating current is determined by the value of the excitation frequency control signals on lines 76a and 76b, respectively, these signals being derived from the summing points 75a and 75b as shown in FIG. 5.

While several embodiments of the invention have been shown and described by way of illustration, other modifications and variations therein will probably occur to persons skilled in the art. For example, a traction alternator having amortisseur windings can be used in practicing the invention, it being understood that in this case the peak current in the traction motors during commutation will be higher than if such windings were omitted. It is therefore intended by the concluding claims to cover all such changes and modifications as fall within the true spirit and scope of this invention.

What I claim as new and desire to secure by Letters Patent of the United States is:

1. The process of propelling a vehicle equipped with at least one adjustable speed a-c traction motor energized by the alternating output current of a variable-frequency controlled current, static electric power inverter, comprising the steps of:
   a. providing on-board the vehicle a traction alternator having armature and field windings and a rotor;
   b. rotating the rotor of said alternator;
   c. exciting the field winding of said alternator;
   d. converting the alternating output current of the armature windings of said alternator to a unidirectional current;
   e. feeding said unidirectional current to d-c terminals of said inverter without appreciably smoothing said unidirectional current and without appreciably smoothing the d-c terminal voltage of said inverter;
   f. controlling the switching frequency of said inverter so as to vary the fundamental frequency of its alternating output current as desired; and
   g. controlling the excitation of said field winding so as to vary, as desired, the fundamental amplitude of the alternating output current of said armature windings and consequently the average magnitude of said unidirectional current and hence the amplitude of the inverter output current.

2. The process as set forth in claim 1 for propelling a vehicle equipped with at least one adjustable speed a-c traction motor consisting of an induction motor.

3. The process as set forth in claim 1 for propelling a vehicle equipped with at least one adjustable speed a-c traction motor consisting of a synchronous motor.

4. The process of claim 1 wherein the step of rotating the rotor of said alternator comprises rotating said rotor at a variable speed and varying the speed of rotation with the desired power requirements of the vehicle.

5. The process as set forth in claim 1 wherein the first step comprises providing on-board the vehicle a traction alternator having armature and field windings and a rotor but no amortisseur windings.

6. The process as set forth in claim 1 wherein there is provided a further step of deriving an angle feedback signal representative of the phase angle between current and flux that interact in the a-c traction motor to develop motor torque, and wherein the inverter switching frequency controlling step is responsive to said angle feedback signal so as to vary the fundamental frequency of the inverter output current as necessary to minimize the difference between actual and desired values of said phase angle.

7. An improved propulsion system for a traction vehicle having an on-board source of power, said vehicle being equipped with at least one adjustable speed a-c traction motor energized by the alternating output current of a variable-frequency controlled current, static electric power inverter, the improvement comprising in combination:
   a. a traction alternator having armature and field windings and a rotor driven by a prime mover;
   b. means for exciting the field winding of said alternator;
   c. means for converting the alternating output current of the armature windings of said alternator to a unidirectional current;
   d. means connected between said converting means and d-c input terminals of said inverter for feeding said unidirectional current to said inverter, said current feeding means consisting of a d-c link characterized by inductance of insufficient value to appreciably smooth said unidirectional current and by capacitance of insufficient value to appreciably smooth the d-c terminal voltage of said inverter;
   e. means for controlling the switching frequency of said inverter so as to vary the fundamental frequency of its alternating output current as desired; and
   f. means for controlling said field winding exciting means so as to vary, as desired, the fundamental amplitude of the alternating output current of said armature windings and consequently the average magnitude of said unidirectional current and hence the amplitude of the inverter output current.

8. The system as set forth in claim 7 wherein said d-c link includes an isolating inductor having an inductance substantially less than the inductance value required to effectively smooth current passing through it.

9. The system as set forth in claim 7 wherein any capacitors connected to said d-c link are so small that the link capacitance is substantially less than the capacitance value required for effectively smoothing d-c terminal voltage of a controlled voltage, static electric power inverter.

10. The system as set forth in claim 7 wherein said traction alternator has no amortisseur windings.

11. The system as set forth in claim 7 wherein the improved combination additionally includes means for deriving an angle feedback signal representative of the phase angle between current and flux that interact in the a-c traction motor to develop motor torque, and wherein said inverter switching frequency controlling means is responsive to said angle feedback signal so as to vary the fundamental frequency of the inverter output current as necessary to minimize the difference between actual and desired values of said phase angle.

* * * * *